United States Patent [19]

Stahl

[11] 4,434,613

[45] Mar. 6, 1984

[54] CLOSED CYCLE GAS TURBINE FOR GASEOUS PRODUCTION

[75] Inventor: Charles R. Stahl, Scotia, N.Y.

[73] Assignee: General Electric Company, Schenectady, N.Y.

[21] Appl. No.: 298,571

[22] Filed: Sep. 2, 1981

[51] Int. Cl.³ .............................................. F02C 6/18
[52] U.S. Cl. ................................ 60/39.07; 60/39.182; 60/39.52
[58] Field of Search ................. 60/39.02, 39.07, 39.12, 60/39.182, 39.52

[56] References Cited

U.S. PATENT DOCUMENTS

| | | | |
|---|---|---|---|
| 2,423,527 | 7/1947 | Steinschlaeger | 196/67 |
| 2,660,032 | 11/1953 | Rosenthal | 60/39.02 |
| 2,839,892 | 6/1958 | Rosenthal | 60/39.05 |
| 3,703,807 | 11/1972 | Rice | 60/39.182 |
| 3,775,976 | 12/1973 | Karig | 60/39.52 |
| 3,785,145 | 1/1974 | Amann | 60/39.52 |
| 4,121,912 | 10/1978 | Barber et al. | 48/197 |
| 4,133,171 | 1/1979 | Earnest et al. | 60/39.52 |
| 4,160,479 | 7/1979 | Richardson et al. | 166/267 |
| 4,313,300 | 2/1982 | Wilkes et al. | 60/39.02 |

FOREIGN PATENT DOCUMENTS 46-18209  5/1971 Japan .............................. 60/39.182

OTHER PUBLICATIONS

Cox, H. R., *Gas Turbine Principles and Practice*, New York, Van Nostrand Company, 1955, pp. 15-13-15-14.

Doscher, "Enhanced Recovery of Crude Oil", AM. Scientist, pp. 193-199, 3-4/81.

Kozak/Sr.; A. L., "Stag Combined-Cycle Power Plant Design", GE Co. 1977.

Hefner, W. J. et al., "Stag Combined-Cycle Product Line Review", GE Co. 1977.

Junge, R. M., "The MS7001E Heavy-Duty Gas Turbine", General Electric Co. 1979.

*Primary Examiner*—Louis J. Casaregola
*Attorney, Agent, or Firm*—John F. Ahern; Robert C. Kain, Jr.

[57] ABSTRACT

A gas turbine is employed in a combined cycle system to produce one or more chemically useful products. Selected exhaust gases are fed back into the gas turbine compressor so as to establish a stable mixture of working fluid constituents for the gas turbine. The gas turbine is preferably configured in a combined cycle arrangement and both mechanical and thermal energy is extracted from the flow of gases through the load turbine, this energy being used in the production of useful process fluids. The methods and apparatus of the present invention are particularly unique in that here the principal output of the combined cycle plant is not electrical energy but rather valuable chemical products. In short, the gas turbine is being employed as a high-temperature reactor from which both mechanical and thermal energy may be extracted as a result of the energy in the gaseous reaction products.

6 Claims, 5 Drawing Figures

CLOSED CYCLE GAS TURBINE FOR GASEOUS PRODUCTION

This application is a continuation-in-part of my co-pending application Ser. No. 263,316, filed May 13, 1981, and commonly assigned.

BACKGROUND OF THE INVENTION

This invention relates to closed cycle gas turbine systems and, in particular, to such systems operated as high-temperature reactors. Gas turbines are well known for their use in the production of electrical energy, particularly for their use by electric utilities to meet demands for peak power requirements. In general, gas turbines include a compressor which receives atmospheric gases including oxygen and nitrogen and a combustor which receives pressurized gases from the compressor and a hydrocarbon fuel. These constituents are ignited in the combustor and permitted to expand through a turbine. This turbine is typically mounted on the same shaft as the compressor. To avoid confusion herein, this turbine through which the ignited gases expand is referred to as the load turbine or power turbine. Also, as used herein, the term gas turbine refers to the combination of the compressor, the combustor and load turbine. Thus, even through the load turbine is indeed, in one sense, a gas turbine, it is not referred to as such herein so that the term gas turbine may be more appropriately applied to the above-mentioned combination. Furthermore, it should also be noted that several of the more advanced gas turbine configurations employ multiple combustors.

It has relatively recently been recognized that the gas turbine may be used in combination with a steam turbine in a combined cycle plant. These plants, like the gas turbine systems described above, are generally employed in the production of electrical energy. However, the combined cycle plant generally exhibits significantly improved overall operating efficiency because of the fact that the hot exhaust gases from the load turbine are directed through a heat recovery steam generator to produce steam to drive a conventional steam turbine-generator combination. Thus, in conventional combined cycle plants, electrical energy is produced not only from a generator driven by the gas turbine but also by one driven by a steam turbine.

Moreover, in gas turbine systems and in combined cycle systems employing gas turbines, the compressor input is generally open to the atmosphere, thus permitting nitrogen to be introduced into the combustor. Accordingly, as a result of the high temperatures produced in the combustor, it is not unusual that nitrogen oxides are produced. Nonetheless, gases are not generally fed back into the compressor from the load turbine exhaust. However, steam is sometimes introduced into the compressor as a means for limiting the production of nitrogen oxides. Apart from this, gas turbines and combined cycle plants employing gas turbines are generally not used in the production of commercially valuable fluids, chemical elements or compounds.

In a totally unrelated field, it is also known that various fluids and gases may be employed to enhance the recovery of oil from wells from which the primary oil resource has been removed. These fluids include such items as carbon dioxide, steam and nitrogen, all of which may be employed in the tertiary recovery of oil. For example, steam may be produced on site from boilers which are heated, at least in part, from the combustion of previously recovered oil or oil derivatives. Likewise, nitrogen is readily available from atmospheric sources. However, the amount of atmospheric carbon dioxide available is very limited.

It should also be noted that there is significant commercial value to the production of liquefied or solidified carbon dioxide, nitrogen, other air products such as argon and/or steam. Such fluids or solids often find uses in various heating or cooling applications. The growing science of supercritical gas solvents also uses gases such as carbon dioxide and nitrogen.

SUMMARY OF THE INVENTION

In accordance with a preferred embodiment of the present invention an apparatus for producing one or more fluids including at least carbon dioxide comprises a gas turbine having a compressor and a load turbine driven by complete combustion of gases introduced into a combustor. Also included are means for supplying a hydrocarbon fuel and an excess of oxygen to the combustor to produce carbon dioxide and means for feeding back at least some of the carbon dioxide to the compressor. In accordance with one particular embodiment of the present invention the exhaust gases from the load turbine are first used to produce steam which drives a steam turbine. In accordance with a preferred embodiment of the present invention the fuel introduced into the combustor is a gaseous fuel, such as natural gas or methane, using oxygen gas as the oxidant, in which case the exhaust gases essentially comprise carbon dioxide, water vapor and unburned oxygen. The gaseous fuel may be mixed with inert constituents such as $CO_2$ and this system is adapted to accept up to 50% by volume of such inert contaminants. In this embodiment, a condenser is used to extract water vapor from the output of the heat recovery steam generator and a mixture of carbon dioxide and oxygen is fed back into the compressor which is sealed from the atmosphere. The amount of gases fed back to the compressor is approximately constant. The remainder of the generated carbon dioxide and the residual oxygen associated with the carbon dioxide is fed to a compressor or other devices for separating the oxygen and carbon dioxide while the oxygen removed is fed back to the gas turbine combustor and the relatively pure carbon dioxide used for enhanced oil recovery or other uses. Additionally, the electrical or mechanical energy produced by the load turbine or the steam turbine may be employed to run an oxygen plant to remove oxygen from air, the oxygen likewise being introduced into the compressor or combustor. Nitrogen and other air products such as argon may also be removed from the atmosphere in either gaseous or liquid form as byproducts of oxygen separation. In short, the present invention has inputs of fuel and air and outputs of carbon dioxide, water and optionally various amounts of steam, nitrogen residual gases and electric power. Since the fuel gas is completely burned and nitrogen is not fed into the combustor and the non-circulated carbon dioxide is used for oil recovery the system is non-polluting since it has no direct atmospheric effluent.

In accordance with another embodiment of the present invention, a method for operating a gas turbine comprises sealing the gas turbine from atmospheric input and introducing either into the compressor or the combustor various chemical reactants such as, but not limited to, steam inert gases, gaseous or liquid hydrocarbon fuels and excess oxygen.

In still another embodiment of the present invention a gas turbine cycle is employed to produce one or more gases, including carbon dioxide, nitrogen and steam, any one or combination of which may be employed in crude oil recovery operations by injecting the gas or gases either in combination or sequentially into well holes to enhance the output of crude oil therefrom.

Accordingly, it is an object of the present invention to provide a method for employing gas turbines as high-temperature gaseous process reactors.

It is also an object of the present invention to provide a gas turbine for the production of large amounts of fluids and gases useful in the recovery of tertiary oil and oil recovery in general.

BRIEF DESCRIPTION OF THE FIGURES

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

A significant aspect of the present invention is that various fluid hydrocarbon fuels contaminated with inert gases and excess oxygen are introduced into a gas turbine employed as a process turbine for the purpose of producing carbon dioxide for recirculation and as a pure product under pressure to perform useful work. The gas turbine is particularly useful as a chemical process reactor because each of chemical, mechanical and thermal energy from the reaction are efficiently recovered. This recovered energy may be employed to further process, separate or generate useful products. Moreover, apparatus may be provided for feeding back carbon dioxide as a working medium for the gas turbine.

Figure 1:
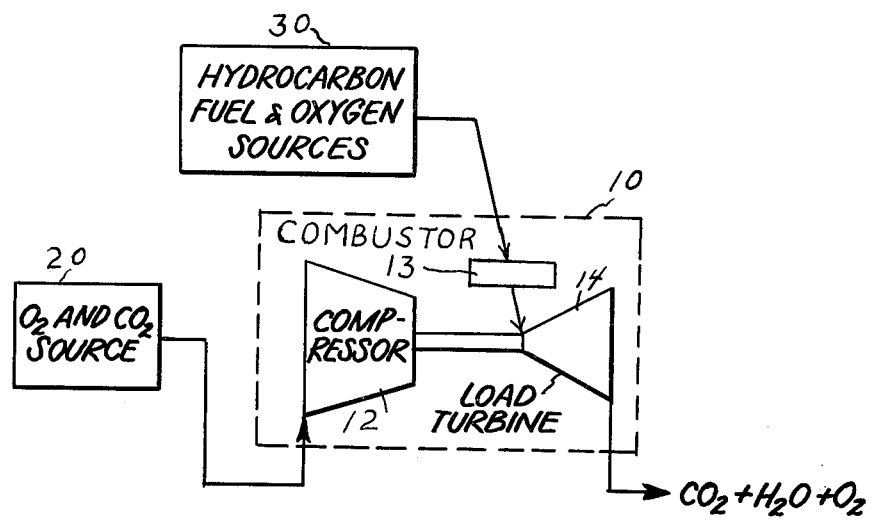
FIG. 1 is a schematic diagram illustrating one embodiment of the present invention.

FIG. 1 illustrates one embodiment of the present invention in which the gas turbine is used as a process reactor primarily for the production of carbon dioxide. However, the system can also recycle $CO_2$ that is mixed with the fuel gas for reuse. It is of particular note that the process turbine devices of the present invention are particularly useful in those applications where a large quantity of reaction product is desired. For example, for the case illustrated in FIG. 1, the on site production of large quantities of carbon dioxide is desirable in enhanced oil recovery methods. Here gas turbine 10 comprises compressor 12, combustor 13 and load or power turbine 14. Combustor 13 receives a combination of hydrocarbon fuels and oxygen from sources collectively designated by reference numeral 30. While oxygen is the preferred oxidizer, other oxidants may be employed. Similarly, compressor 12 receives a mixture comprising at least carbon dioxide from sources 20. Carbon dioxide is not only the output of the apparatus but, in the present case, is the working fluid for gas turbine 10. In preferred embodiments of the present invention, source 20 provides at least carbon dioxide which is fed back to the compressor 12 from the exhaust gas flow. For those applications in which carbon dioxide is the desired output of the gas turbine process reactor, it is preferable that a stoichiometric excess of oxygen be provided to ensure complete combustion of the hydrocarbon fuels such as methane or natural gas. Any excess oxygen is easily returned to the combustor for later reaction.

In contrast to prior art applications of gas turbines, the present invention is a significant advancement in the art because the chief value derived from the gas turbine is not its ability to act as a prime mover for an electric generator, but rather as a gaseous process reactor producing useful chemical products and electrical power. Here carbon dioxide not only acts as the working fluid but also as the principal reaction product, rather than as a waste product which is vented to the atmosphere. This particular product is of great importance in enhanced oil recovery methods and other systems. In this regard, it should be noted that the output temperature and pressure of the carbon dioxide produced makes it well suited for oil field use with minimal post-production requirements. In short, carbon dioxide exhausted from the gas turbine 10 may be employed directly by injecting it into an oil well hole without having to expend large amounts of energy to optimize its use in promoting tertiary oil extraction.

Figure 2:
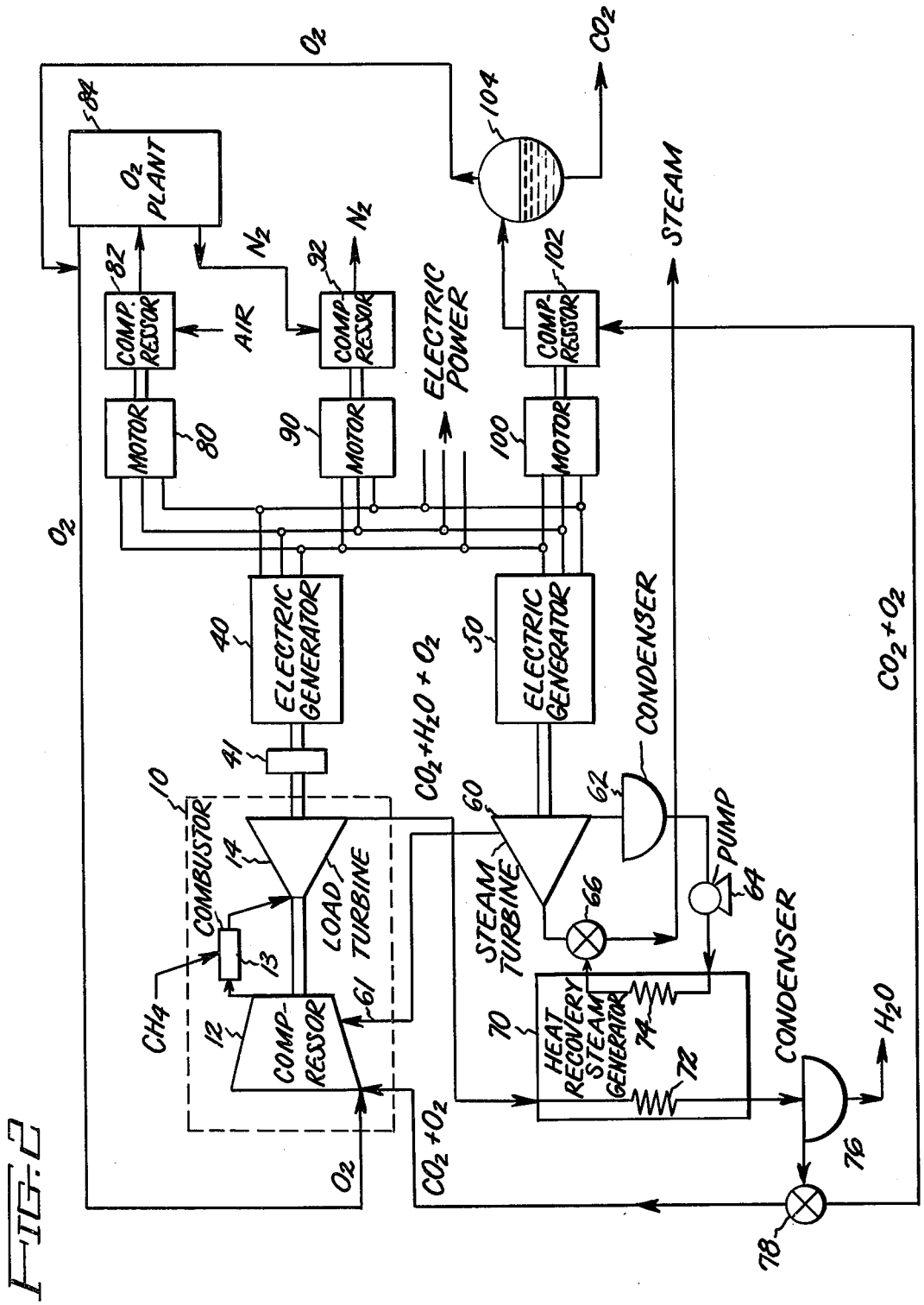
FIG. 2 is a schematic diagram illustrating the use of the present invention in a combined cycle configuration for producing a plurality of useful products.

FIG. 2 illustrates another preferred embodiment of the present invention and more particularly shows means for extracting the mechanical and thermal energies present in the exhaust gases from the load turbine 14. In particular, load turbine 14 may be coupled to electric generator 40, as is typically done by mounting it on the same shaft or by coupling the generator to the load turbine through a high-efficiency gear coupling 41 as shown in order to permit lower speed load turbine operation. Likewise, recovery of thermal energy in the exhaust gases is readily accomplished by passing these gases through heat recovery steam generator 70 having circuit 72 for the passage of gases therethrough and separate circuit 74 for the generation of steam which is heated by, but not mixed with, said exhaust gases. The exhaust gas primarily comprises carbon dioxide, water and oxygen. Fortunately, the water is readily removed by passing the gases through condenser 76 leaving a mixture of carbon dioxide and oxygen which may be recirculated back to the compressor 12 through valve 78. By controlling the amount of oxygen injection into combustor 13, the proportion of oxygen in the feedback loop to the compressor may be controlled. In any event, after a short period of stable operation a stabilized stoichiometric flow of gases exists through gas turbine 10. As desired, valve 78 may be employed to divert a selected quantity of the uncondensed gases (carbon dioxide and oxygen) from which carbon dioxide may be removed through operation of compressor 102 and cold tank 104.

The steam generated in circuit 74 of heat recovery steam generator 70 is controlled by valve 66 which selectively diverts the flow of steam from steam turbine 60. In some enhanced oil recovery operations this steam is also employed to increase the amount of oil which flows from the well hole. Having passed through steam turbine 60, steam is condensed to water in condenser 62, and pump 64 recirculates it back through steam circuit 74 whereupon the water is reheated and converted to steam as described above. Steam is also extracted from steam turbine 60 and injected into compressor at 61 to be mixed with the carbon dioxide working fluid and oxygen to lower the mass of the working fluid mixture to prevent the compressor from stalling.

Electric generators 40 and 50 are employed either together or separately to provide electrical power to motors 80, 90 and 100 which drive compressors 82, 92 and 102, respectively. Moreover, electric generators 40 and 50 also provide surplus electric power which may be used either on-site, sold off-site or otherwise connected to a utility power grid. While compressors 82, 92 and 102 may be connected directly to one or more of either load turbine 14 of steam turbine 60, the intermediate step of electric power production provides greater flexibility and control of the overall system operation. In short, direct mechanical connections to the compressors may require fixed pressures and feed rates. Such limited flexibility is not always desirable.

In the particular embodiment shown in FIG. 2, electric motor 80 drives the compressor 82 of an air liquefaction plant 84 which separates oxygen from the other gaseous atmospheric constituents. It is this oxygen supply which is preferably employed to supply combustor 13 of gas turbine 10. At this point, it is also economical to compress the nitrogen for other uses. This is readily accomplished by compressor 92 which is driven by motor 90. The apparatus of the present invention thus provides a supply of compressed nitrogen which is itself a commercially marketable product. In addition, gaseous nitrogen is also employable as one of the fluids used in enhanced oil recovery methods. A state-of-the art modification of the air liquefaction plant can be made that will provide the oxygen and nitrogen in a liquid state if such is desired. With respect to FIG. 2, it is finally noted that there is a certain amount of carbon dioxide and oxygen which is typically not recirculated to compressor 12 but rather is supplied to compressor 102 which is driven by motor 100. The resulting compressed mixture is introduced into cold tank 104 in which carbon dioxide condenses out as a pressurized liquid so that the noncondensible gases such as oxygen can be separated from the $CO_2$. This pure $CO_2$ may then be injected into well holes. At the same time the remaining gaseous oxygen is removed from tank 104 and it too is circulated back to provide oxygen to compressor 12.

Figure 3:
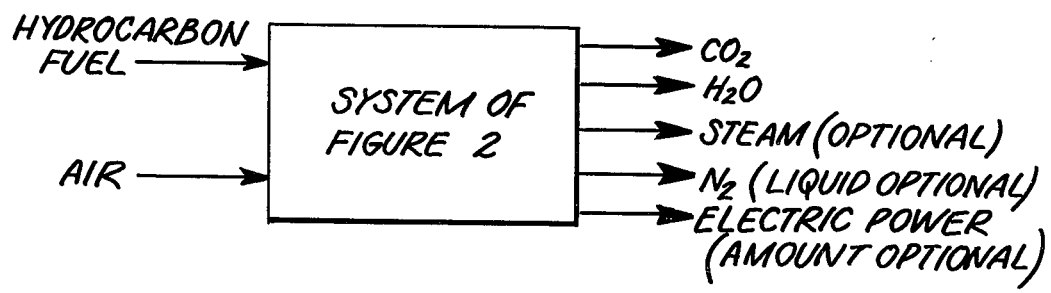
FIG. 3 is an overall block diagram illustrating the material supplied to the system and the system products, including electric power.

FIG. 3 is illustrative of the fact that the apparatus of FIG. 2 may be operated as a power plant having totally non-polluting emissions. In particular, FIG. 3 illustrates the fact that the only materials supplied to the system of FIG. 2 are fuel and air and the chief products are carbon dioxide, nitrogen, and water. Additionally, steam is available as an optional product. In addition, with an additional increase in energy expenditure, liquid nitrogen can be produced. Additionally, electric power is produced as a non-tangible, but nonetheless extremely valuable byproduct. It should be noted, however, that while gaseous nitrogen in the system is free of oxygen, it nonetheless does contain certain trace quantities of gases such as argon that may also be separated in the air plant and are valuable byproducts.

Figure 4:
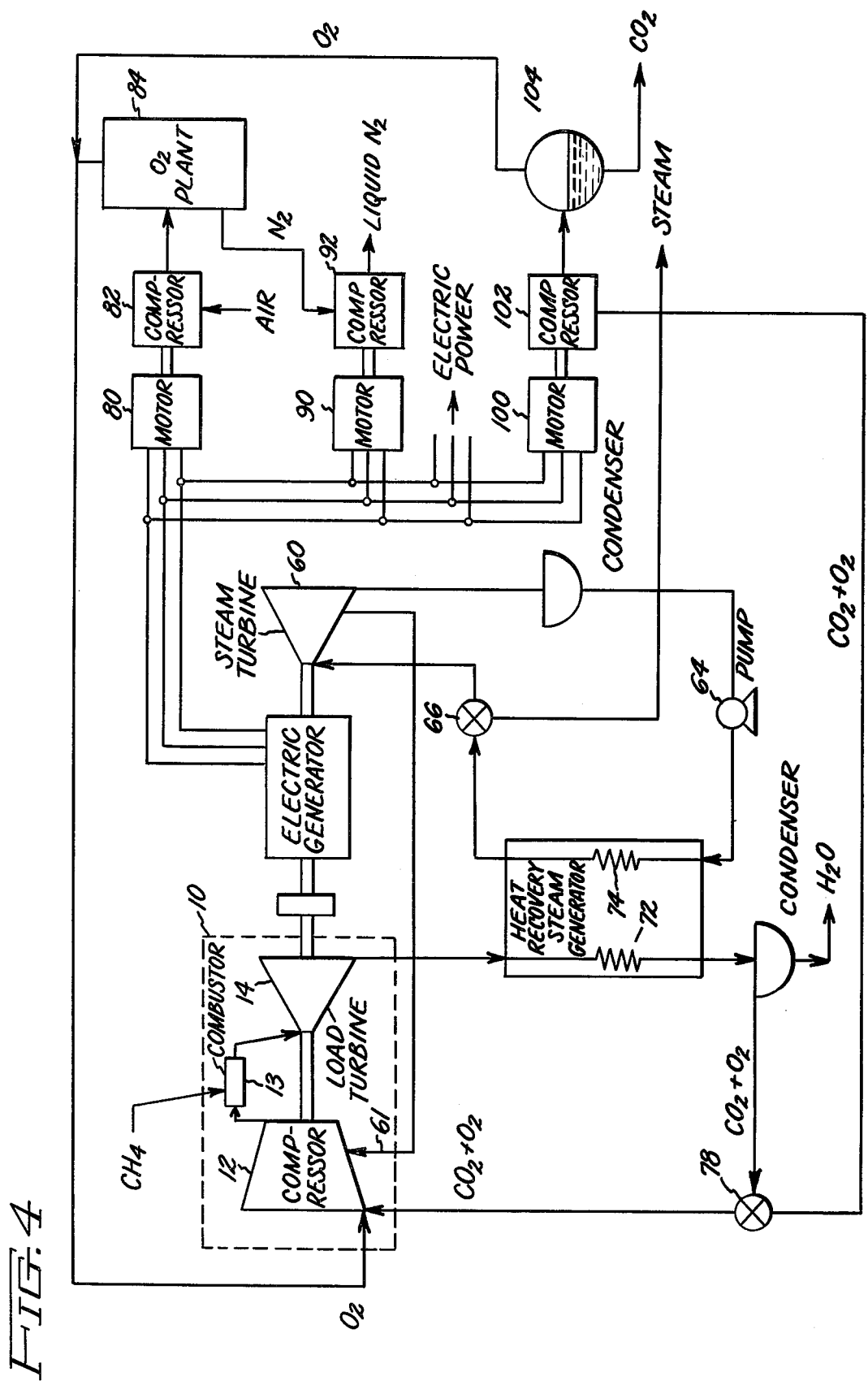
FIG. 4 is a schematic diagram illustrating an embodiment of the present invention in which an electric generator is driven simultaneously by a steam turbine and a gas turbine.

FIG. 4 illustrates another embodiment of the present invention in which electric generator 40 is driven by either or both of load turbine 14 and steam turbine 60. However, such an arrangement is not as flexible as the configuration shown in FIG. 2 but the apparatus of FIG. 4 may be used for many applications.

Figure 5:
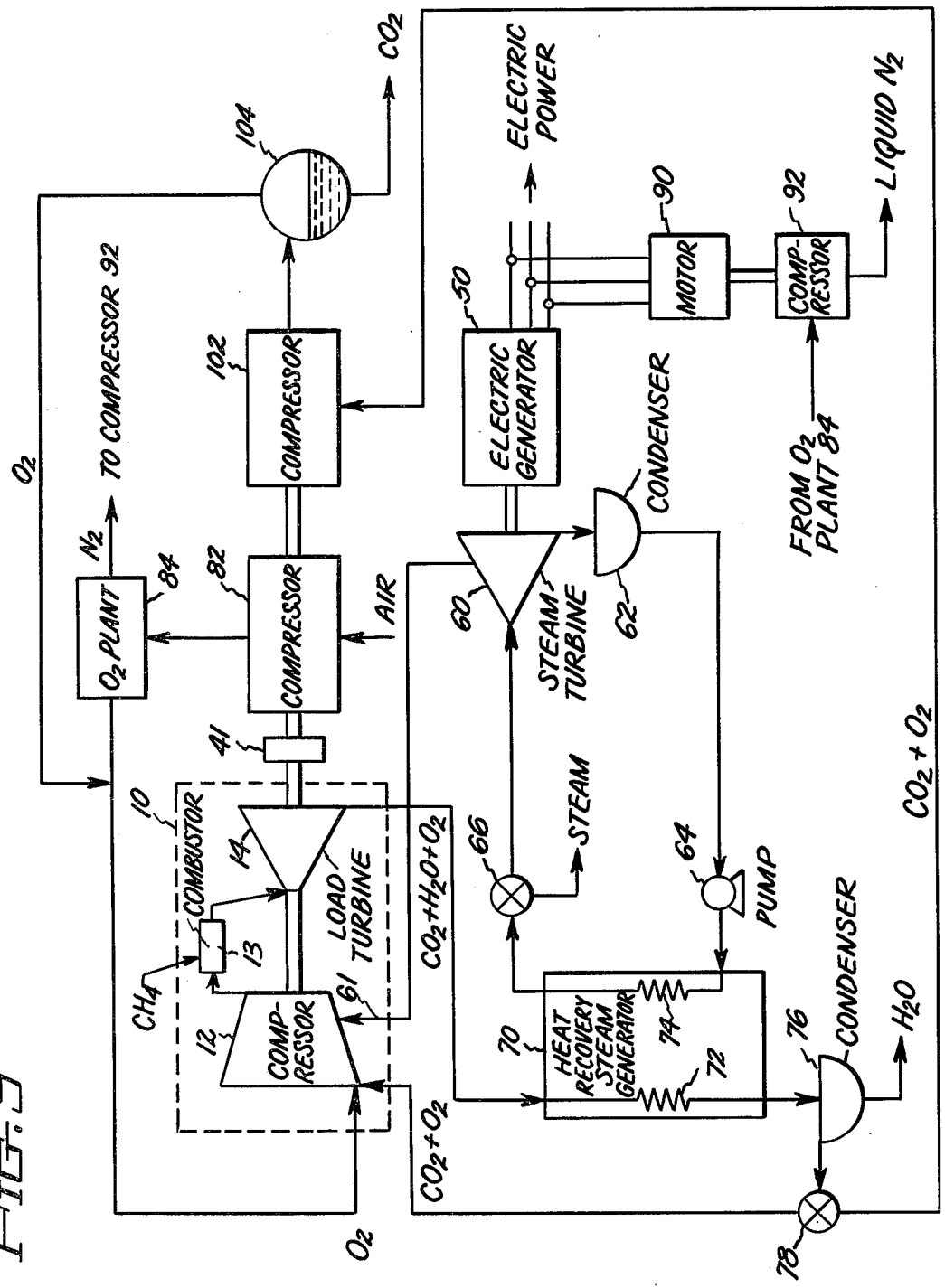
FIG. 5 is a schematic diagram of the present invention illustrating an embodiment in which one or more fluid compressors are driven directly from the load turbine.

FIG. 5 likewise shows another embodiment of the present invention in which load turbine 14 of gas turbine 10 directly drives compressors 82 and 102. These compressors serve the same function as shown in FIG. 2.

The fuel employable in the present invention generally comprises any suitable hydrocarbon. The lower molecular weight hydrocarbons are preferred, particularly gaseous methane. For use in most applications, the preferred source of fuel is natural gas which chiefly comprises methane. A particular advantage of the present invention is that it operates well on natural gas from wells which may be contaminated with carbon dioxide. Proper control of stoichiometric mixtures introduced into combustor 13 are well able to compensate for this carbon dioxide inclusion. Additionally, natural gas may be contaminated with gases such as hydrogen sulfide. This contaminant can, unless it is prefiltered by absorption from the hydrocarbon fuel, cause more difficult chemical process problems. In particular, heat recovery steam generator 70 may experience corrosive acidic attack as a result of the sulfur oxides produced in the combustor if the temperature is allowed to reach the dew-point temperature. Therefore, care must be taken to keep the temperature of circuit 72 of heat recovery steam generator 70 at proper levels or provide corrosion-resistant material. Since the condenser 76 will indeed be below the dew-point temperature a corrosion-resistant lining will be required. The condenser 76 is a spray-type condenser and therefore will remove the gaseous sulfur oxide and other gaseous and particulate contaminants, e.g., ash, either using pure water or by using appropriate chemical additives.

A further unique aspect of the present invention is that the input to the compressor is generally closed to the atmosphere, except during startup. Similarly, the exhaust of the gas turbine is used or recycled rather than being vented to the atmosphere. While it is possible to operate the gas turbine by feeding back only carbon dioxide, it has a relatively high molecular weight, namely, 44, as compared with air with an average molecular weight of approximately 29. Under certain circumstances, this can cause stalling of the compressor. It is therefore desirable that steam and excess oxygen be introduced into the compressor so that the gases fed back to the compressor have a lower average molecular weight than carbon dioxide alone. In this respect, the apparatus of the present invention is unique in that it creates its own artificial atmosphere as an input to the compressor, which is controlled to approximate the mass of air. In addition, the compressor/turbine unit operates at 3000 RPM compared to an air system which operates at 3600 RPM. A gear 41 permits the generator to operate at 3600 RPM and therefore generate 60 Hz ac power. This lower speed also aids in preventing the compressor stalling with the higher mass working fluid.

As indicated above, the gas turbine of the present invention may be employed as a gaseous process reactor and as such various catalysts may be employed to enhance various chemical reactions occurring in the combustor. These catalysts may be either injected as gases or liquids into gas turbine 10 or may actually be deposited or otherwise placed in fixed positions within the gas turbine itself to enhance or modify the chemical reactions which take place.

As indicated above, the present invention may be practiced using only a gas turbine power plant adapted to operate in a substantially closed cycle using principally $CO_2$ as the working fluid, diluted so as not to stall the compressor. Preferably, however, the invention is practiced utilizing a combined cycle comprising a steam turbine and a gas turbine which provides heat to produce the steam to operate the steam turbine. Such a cycle is described in U.S. Pat. No. 4,208,882 issued to Lopes et al.

The analytical work for the development of this invention has been performed with respect to a General Electric STAG(TM) 100 combined cycle power plant utilizing a General Electric Model MS7001E Heavy-Duty Gas Turbine. The former is described in General Electric engineering brochures entitled "STAG COMBINED CYCLE POWER PLANT DESIGN" by Andrew L. Kozak, Sr. and "STAG COMBINED CYCLE PRODUCT LINE REVIEW" by W. J. Hefner and L. 0. Tomlinson. The latter is described in a brochure entitled "The MS7001E Heavy-Duty Gas Turbine" by R. M. Junge. All of the foregoing brochures are incorporated by reference herein and are widely distributed in the power generating and electric utility markets and may be obtained from any General Electric Utility Sales Division District Office, or from Gas Turbine Division, General Electric Company, Schenectady, N.Y. 12345.

While the preferred fuel for operation of gas turbines in accord with the invention is methane, other hydrocarbon fuels may be used. Thus, for example, any "clean" gas or liquid having a high BTU content may be used. By "clean" is meant having sufficient freedom from chemically active impurities as would produce agents which will be detrimental to the metal and other constituents of the gas turbine and associated parts. As noted above $H_2S$ is an impurity which is often found in natural gas and, although acceptable in small proportions, is detrimental. If it is present, special care must be taken in controlling temperatures and use of corrosion-resistant materials. Preferably $H_2S$ containing gases should be removed by absorbers, well known to the art, prior to introduction of the fuel fluid into the combustor of the gas turbine. Other suitable fuels include hydrocarbons of the parafin series from $CH_4$ (methane) to $C_6H_{14}$; also, hydrocarbons of the olefin series and the aromatic series. Carbon dioxide in any quantity up to 50% is acceptable as a diluent. Since the likely fuel for this system in the enhanced oil recovery mode will be gas that is associated with the oil recovered, the contamination of this associated gas with $CO_2$ that has broken through to a producing well is evident. While this system generates $CO_2$ from the combustion process it also recycles the $CO_2$ that is contained in the associated gas which contains the hydrocarbon fuel.

In operation, the gas turbine cycle of the invention is started using air and hydrocarbon fuel, for example, as fuel and combustion is initiated. As the cycle progresses carbon dioxide from the turbine exhaust is recirculated back to the compressor and oxygen and steam (in the combined cycle configuration) are also added to the compressor to keep the mass of the working gas close to the mass of air to prevent stalling of the gas turbine compressor.

One set of equilibrium parameters which are suitable for operation of the combined cycle plant of FIG. 2 is as follows. The input to the compressor is chosen to be about 125 lbs/sec of oxygen ($O_2$), 469 lbs/sec of carbon dioxide ($CO_2$) and 29 lbs/sec of steam for a total flow of 623 lbs/sec at a pressure of 14.7 PSIA and a temperature of 120° F. Steam, extracted from the steam turbine enters the compressor at near midpoint as a flow rate of 32 lbs/sec and a pressure of 150 PSIA and temperature of 500° F. Of the total output of the compressor of about 654 lbs/sec, about 54 lbs/sec are caused to flow over the turbine parts as coolant, and the remaining 600 lbs/sec are input to the combustor at about 167 PSIA and 531° F. Fuel gas at about 80° F. and a non-critical pressure in excess of 167 PSIA flows into the combustor at a rate of about 48.6 lbs/sec, (13 lbs/sec 15 methane and 35.6 lbs/sec 68 diluent carbon dioxide—50% by volume).

After combustion, the combustion products will exit at a temperature of 1880° F. and a pressure of 155 PSIA and flow through the turbine. The turbine will exhaust at 1173° F. and 15.96 PSIA with a total flow of 701 lbs/sec. The exhaust contains 90 lbs/sec of steam, 72 lbs/sec of oxygen and 539 lbs/sec carbon dioxide. It will be noted that combustion consumes oxygen and methane and produces $CO_2$ and $H_2O$ both of the latter being present in greater volume than before combustion. It is therefore possible to remove $CO_2$ from the system at valve 78, compress it at compressor 102, separate it from oxygen at tank 104 and provide it to the wellhead for tertiary oil recovery, typically at 1500 to 2000 PSIA.

Prior to the foregoing, the products of combustion are input to the load turbine 14 and cause the shaft to rotate. Rotation may be at any speed desired to provide the correct frequency generator output. Direct drive rotation of 3600 RPM with a 2-pole synchronous generator produces 60-cycle power. In another embodiment a speed of 3000 RPM may be used and a high-efficiency gearing arrangement will also produce 60-cycle power with a 2-pole, 3600 RPM synchronous generator. Lower rotational speeds are more compatible with this system using the heavier $CO_2$ as opposed to the normal working fluid of air.

The turbine exhaust is input to the Heat Recovery Steam Generator (HRSG) 70, and after a pressure drop of approximately 25" $H_2O$ enters condenser 76 which will separate out about 34 lbs/sec of $H_2O$ $CO_2$ and $O_2$ are passed to valve 78 which separates the flow into two streams, one of which goes to the compressor to continue the cycle and the other of which directs $CO_2$ and $O_2$ to compressor 102 and cold tank 104. From cold tank 104 a flow of $CO_2$ at a flow rate of about 52 million SCF/day will be available for direction to the oil well for tertiary recovery. The remainder, from valve 78, is input to the compressor along with a flow of oxygen from $O_2$ plant 82 of about 52 lbs/sec to provide the input to the compressor first described at the beginning of the cycle.

HRSG 70 produces steam at a pressure of 1141 PSIG and temperature of about 950° F. and a flow rate of about 467,000 lbs/hr. This steam is fed to steam turbine 60 which is a single casing extraction turbine operating with a condenser pressure of 2½" of mercury. Steam is extracted from turbine 60 to provide steam to input to compressor 12 to adjust the mass of the working fluid. Generator 50 is directly driven by turbine 60 at a speed of 3600 RPM. It is a 2-pole machine and produces 60-cycle power which is in addition to the electric power produced by generator 40 driven by load turbine 14 of gas turbine 10.

I am aware of the existence of U.S. Pat. No. 4,160,479 issued July 10, 1979 to Richardson et al. This patent is superficially related to this invention since it proposes the use of a combined steam turbine and gas turbine for tertiary oil recovery. On the other hand the combined cycle used in the cited patent is an open cycle and is conventional. Its use in tertiary oil recovery is principally as a source of exhaust waste gases containing waste heat for use in various aspects of the chemical processes performed in the oil recovery processes, or for injection directly into the wellhead to facilitate recovery of heavy crude oil. Additionally, the electricity generated from the power generation cycle is used in part to electrolyze water to $H_2$ to be used in the chemical processes to upgrade the residual oil and $O_2$ to be used in gasification. The combustion cycle is conventional and there is no production of carbon dioxide to be used in miscible tertiary recovery as is utilized in the practice of my invention. I am also aware of U.S. Pat. Nos. 2,423,527—Sleenschlaeger; 2,660,032—Rosenthal; and 4,121,912—Barber et al., all of which use a combustor which is associated with an expansion (gas) turbine and which drives an electric generator. The combustors of these patents operate as chemical reactors to change or produce various effluents, but they all differ from my invention in significant features. While my invention utilizes complete combustion of hydrocarbon fuel and produces carbon dioxide which recirculates back to the compressor and constitutes a working fluid, the foregoing patents utilize incomplete combustion and do not recirculate $CO_2$. In fact all are essentially open cycles and utilize scrubbers, etc., and vent process gas or generated or residual hydrocarbon gas or pipe the same to a user. None are associated with a steam turbine in a combined cycle, and none produce carbon dioxide as a desired product of the combustion cycle.

From the foregoing, it will be appreciated that the apparatus and method of operating the same of the present invention utilize gas turbines in a novel, unobvious and unique manner. In particular, the present invention utilizes a gas turbine cycle as a producer of desirable and useful gaseous reaction components. A particular application of this concept occurs in the method and apparatus shown for producing large quantities of carbon dioxide and other fluids which are useful in the recovery of tertiary crude oil. The system can in parallel recycle the carbon dioxide that will appear in the associated gas of a well for which $CO_2$ is supplied from another source for tertiary recovery. Furthermore, the apparatus of the present invention may be employed not only in oil recovery operations but also in the production of commercially useful products such as steam and liquid nitrogen, in addition to the generation of electric energy. The present invention operates highly efficiently on a large variety of hydrocarbon fuels including methane and natural gas even if contaminants such as carbon dioxide or hydrogen sulfide are present in the fuel supply. Thus, it is seen that the present invention takes the art a significant step forward and greatly extends the range of applications in which gas turbines may be used.

It should be noted that in accord with the mode of operation described herein the gas turbine or the combined cycle need not operate at optimum efficiencies as is the case with utility or industrial usages. The novel features of providing a self-contained, self-sufficient non-polluting combined cycle with only hydrocarbon fuel input and desirable gas product output for a tertiary oil recovery plant which may be disassembled and moved to another oil field after tertiary recovery is completed (if it is not further used for electric power generation purposes) need only be more cost-effective as compared with other tertiary oil recovery systems. One such system contemplates drilling wells to produce $CO_2$ and piping the same approximately 400 miles through a pipeline having no other apparent purpose, to depleted oil fields where it must be pressurized before pumping into the wellhead for tertiary oil recovery. The present invention can approach a cost-effective advantage of an order of magnitude over such a system. Additionally, the $CO_2$ and $H_2$ product of this system cannot only be used for oil recovery from light oils but also can be used for any requirement where supercritical gas solvents are required.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An apparatus for producing fluids including at least carbon dioxide comprising:
   a gas turbine having a gas compressor and a load turbine driven by combustion of gases introduced into a combustor, said combustor receiving gases at least partially from said compressor;
   means for supplying hydrocarbon fuel to said combustor;
   means for supplying a stoichiometric excess of oxidant to said combustor to effect complete combustion;
   means for feeding back at least some gaseous exhuast including carbon dioxide to said compressor from the output of said load turbine;
   means to at least partially divert from said compressor the feedback flow thereto; and
   means to remove carbon dioxide from said diverted feedback flow.

2. The apparatus of claim 1 in which said carbon dioxide removal means comprises a compressor for carbon dioxide liquefaction.

3. The apparatus of claim 1 further including means to introduce oxygen into said combustor gases from the diverted flow from which carbon dioxide has been removed.

4. The apparatus of claim 2 in which said compressor for carbon dioxide removal is driven at least in part by said load turbine.

5. The apparatus of claim 2 in which said means for supplying oxygen comprises an air compressor for removing oxygen from air.

6. The apparatus of claim 1 in which said gas turbine exhaust is closed to the atmosphere.

* * * * *